(12) United States Patent
Andrae et al.

(10) Patent No.: US 11,689,980 B2
(45) Date of Patent: Jun. 27, 2023

(54) ELASTIC TRANSFER AND ADAPTATION OF MOBILE CLIENT-CONTROLLED PROCESSES IN AN EDGE CLOUD COMPUTING LAYER

(71) Applicant: Continental Automotive Technologies GmbH, Hannover (DE)

(72) Inventors: Andreas Andrae, Frankfurt am Main (DE); David Gonzalez Gonzalez, Frankfurt am Main (DE); Osvaldo Gonsa, Frankfurt am Main (DE)

(73) Assignee: Continental Automotive Technologies, GmbH

(*) Notice: Subject to any disclaimer, the term of this patent is extended or adjusted under 35 U.S.C. 154(b) by 0 days.

(21) Appl. No.: 17/911,267

(22) PCT Filed: Apr. 9, 2021

(86) PCT No.: PCT/EP2021/059317
§ 371 (c)(1),
(2) Date: Sep. 13, 2022

(87) PCT Pub. No.: WO2021/209340
PCT Pub. Date: Oct. 21, 2021

(65) Prior Publication Data
US 2023/0102852 A1 Mar. 30, 2023

(30) Foreign Application Priority Data
Apr. 16, 2020 (DE) ...................... 10 2020 204 864.9

(51) Int. Cl.
*H04W 36/12* (2009.01)
*H04W 36/14* (2009.01)
*H04L 67/10* (2022.01)

(52) U.S. Cl.
CPC ............. *H04W 36/12* (2013.01); *H04L 67/10* (2013.01)

(58) Field of Classification Search
None
See application file for complete search history.

(56) References Cited

U.S. PATENT DOCUMENTS 8,171,137 B1 5/2012 Parks et al.
8,694,597 B1 4/2014 Raj et al.
(Continued)

FOREIGN PATENT DOCUMENTS

CN 110647382 A 1/2020
WO 2019094790 A1 5/2019

OTHER PUBLICATIONS

Wang, S. et al., "A survey on service migration in mobile edge computing", IEEE Access, 2018, vol. 6, pp. 23511-23528, ISSN 2169-3536.
(Continued)

*Primary Examiner* — Duc T Duong
(74) *Attorney, Agent, or Firm* — RatnerPrestia

(57) ABSTRACT

A method of initiating a transfer of an active first-type slave process, executed in a first processing entity of an edge cloud computing layer, to a second processing entity of the edge cloud computing layer, includes, at a first mobile entity, receiving a first heat map relating to the first-type master-slave process, ranking, based on a cost function, possible process sharing connections, between the first mobile entity and one or more second processing entities, for the current location of the first mobile entity and/or a location of the first mobile entity in the near future, determining, based on the ranking, one or more second processing entities as potential target processing entities to transfer the first-type slave process to, and transmitting a processing entity transfer request to a control process executed in the edge cloud
(Continued)

computing layer. The request includes an identification of the active first-type slave process and indicates at least one of the second processing entities determined, based on the ranking, as potential target to transfer the active first-type slave process to.

14 Claims, 7 Drawing Sheets

(56) References Cited

U.S. PATENT DOCUMENTS

| | | | |
|---|---|---|---|
| 9,662,572 | B1 | 5/2017 | Laskar |
| 2006/0212585 | A1 | 9/2006 | Eaton et al. |
| 2009/0276440 | A1 | 11/2009 | Tsai |
| 2011/0255512 | A1 | 10/2011 | Lee et al. |
| 2012/0290657 | A1 | 11/2012 | Parks et al. |
| 2013/0016695 | A1 | 1/2013 | Ravindran et al. |
| 2014/0229528 | A1 | 8/2014 | Hutcheson et al. |
| 2015/0172382 | A1 | 6/2015 | Kuscher et al. |
| 2018/0183855 | A1 | 6/2018 | Sabella et al. |
| 2019/0058767 | A1* | 2/2019 | Chandramouli .... H04L 12/1403 |
| 2019/0158606 | A1 | 5/2019 | Guim Bernat et al. |
| 2019/0200271 | A1* | 6/2019 | Agrawal ............. H04W 36/245 |
| 2020/0320397 | A1* | 10/2020 | Liu ..................... H04L 41/0893 |
| 2020/0351900 | A1* | 11/2020 | Zhang ................ H04W 72/542 |
| 2021/0051551 | A1* | 2/2021 | Aftab ..................... H04W 4/90 |
| 2021/0103481 | A1* | 4/2021 | Bernat .................. G06F 9/5072 |
| 2022/0124570 | A1* | 4/2022 | Skarin ................. H04W 36/32 |
| 2022/0247623 | A1* | 8/2022 | Skubic ................. H04W 48/17 |
| 2022/0353732 | A1* | 11/2022 | Filippou ........... H04W 28/0284 |

OTHER PUBLICATIONS

Yu, X., et al., "Pre-migration of vehicle to network services based on priority in mobile edge computing", IEEE Access, 2018, vol. 7, pp. 3722-3730, ISSN 2169-3536.

International Search Report and Written Opinion for International Application No. PCT/EP2021/059317, dated Jul. 22, 2021, 13 pages.

German Examination Report for German Application No. 10 2020 204 864.9, dated Dec. 29, 2020, with translation, 9 pages.

German Communication for German Application No. 10 2020 204 864.9, dated Aug. 6, 2021, with translation, 2 pages.

"Continental and Vodafone: Successful cooperation for safe road traffic", Feb. 21, 2019, 8 pages, with translation.

"Vodafone and Continental: Cooperation for networked security in road traffic", Jun. 10, 2018, 9 pages, with translation.

"Automated Driving—Mobility of the Future", Sep. 16, 2015, 7 pages, with translation.

* cited by examiner

ELASTIC TRANSFER AND ADAPTATION OF MOBILE CLIENT-CONTROLLED PROCESSES IN AN EDGE CLOUD COMPUTING LAYER

CROSS REFERENCE TO RELATED APPLICATIONS

This application is the U.S. National Phase Application of PCT International Application No. PCT/EP2021/059317, filed Apr. 9, 2021, which claims priority to German Patent Application No. 10 2020 204 864.9, filed Apr. 16, 2020, the contents of such applications being incorporated by reference herein.

FIELD OF THE INVENTION

The present invention relates to distributed computing processes, in particular to computing processes that are controlled by a mobile entity connected to edge cloud computing resources through a connectivity layer including a wireless connection, which processes are partly executed in processing entities of the edge cloud computing layer.

BACKGROUND OF THE INVENTION

Many of today's apparatuses or appliances rely on processing of a large quantity of input data for providing services to users. Input data may include all kind of sensor data, e.g. video images, data representing operating states of machines and the like, but may also include data obtained from databases. Data may either be raw data or pre-processed data. Services that require processing large quantities of data during operation may be termed "data heavy".

Processing large quantities of data generally requires a powerful processing device, operation of which may require significant amounts of energy. Some types of processing, e.g., machine learning or an implementation of an artificial intelligence, may require setups and/or components specifically tailored to implement such type pf processing, which may be less versatile as a general-purpose computer of a more classic design when it comes to performing other tasks. In particular in case such type of processing is not required at all times during operation, providing powerful processors or specifically tailored setups and/or components in each apparatus or appliance may be considered inefficient and a waste of resources.

As a consequence, an apparatus or appliance used by a user may not be equipped with a processing device for processing the large quantity of data when providing a data heavy service. Rather, the apparatus or appliance may "outsource" a part of the data processing to a remote data processing entity that may provide the required processing power, task-specific components and/or setup in accordance with the service's requirements, and may be tasked with processing the large quantities of data. Accordingly, a processing entity in this context may be considered a computing instance that is adapted to receiving data from a mobile entity, processing the data and returning processed data to the mobile entity. A processing entity may also be instantiated on a virtual computer or on a dedicated hardware. The apparatus or appliance used by a user may send the data, or links pointing to the data, to the remote data processing entity, which processes the data and returns the processing result to the apparatus or appliance. The processing result is typically, though not necessarily so, represented in a much smaller amount of data than the input data received by the remote data processing entity for processing. Throughout this description the part of the process that is executed in the mobile apparatus or appliance will be referred to as master process, and the corresponding part of the process that is executed in the remote data processing entity will be referred to as slave process. Master process and slave process are communicating through what will be referred to as "process sharing connection" or "slave process sharing connection" throughout this description. Each one of a multiplicity of master-slave processes providing a corresponding multiplicity of services in an apparatus or an appliance may maintain an individual process sharing connection. The individual process sharing connections of one mobile apparatus or appliance may terminate in different processing entities located spatially apart from each other, depending on each service's requirements.

Remote data processing entities may be provided by what is referred to "The Cloud", i.e., clusters of computers and servers that are located at some place and that are connected to users via communication networks, including via the internet. Such cloud compute resources may be located centralized in their totality, or may be stretched out, e.g., along roads in so-called road side units that are all interconnected by a network. The connecting network may be provided by network operators that also provide known communication services, like telecom network providers, or may be provided by municipalities. Cloud compute resources may also be smaller clusters that are interconnected with each other.

Data heavy services may require response times that are as short as possible. As data transfer over long stretches of communication networks may take significant time, depending, inter alia, on the spatial distance between the location of the apparatus or appliance and the location of the remote data processing entity, the number of network segments that the data has to travel through between the apparatus or appliance and the remote data processing entity, the speed of the various network segments providing a connection between the apparatus or appliance and the remote data processing entity, congestion of network segments, and the like, more recent developments place the remote data processing entities ever closer to the apparatus or appliance, yet still within the network rather than in the apparatus or appliance that provides a data heavy service to a user. These remote data processing entities that are spatially close to an apparatus or appliance, yet part of or accessible through a network, form a type of data processing also referred to as edge computing.

The English Wikipedia entry defines edge computing as "a distributed computing paradigm which brings computation and data storage closer to the location where it is needed, to improve response times and save bandwidth in a backbone network." Edge servers may host applications and application components. Modern edge computing makes heavy use of virtualization technology for deploying a wide range of applications on the edge servers.

Edge computing is widely recognized as a very important complement to 5G networks and very likely a native feature in future networks beyond 5G, in particular based on the promise of such networks to deliver very short latencies, which are targeted to be in the one-digit millisecond range or even below. Fast data transmission and short latencies permit offloading processes in applications and services that must guarantee a shortest possible maximum response time between sending the data and receiving the result of the processing. A prominent example for such an application is communication between vehicles or between vehicles and infrastructures, in particular for autonomous driving, and for networked industrial and automation applications. Some form of edge computing may also be used for the purposes of the so-called "Internet of Things" (IoT). Since edge computing is one implementation of cloud computing, the expression "edge cloud computing" will be used throughout this description.

The data connection between a stationary apparatus or appliance providing a data heavy service to a stationary user may be considered persistent over a comparatively long time period. In other words, the critical parameters of the data connection, such as data rate and round-trip time, typically do not change within short time frames.

The situation may be quite different in mobile apparatuses or appliances providing data heavy services.

Mobile apparatuses or appliances are typically connected to edge cloud computing resources through a network layer including at least one wireless segment, e.g., through a radio network that is composed of a plurality of access points, or base stations. In the following description the term wireless access point will be used for any means that provides wireless access to a backbone network, irrespective of the type of wireless connection. Wireless connections may include radio connections according to established or upcoming standards such as 3G, 4G, 5G cellular radio communication, wireless LAN (WiFi), personal short-range wireless connections like Bluetooth®, and the like, but also less-common connections, by today's standards, such as LiFi, in which data is wirelessly transmitted through modulated light. Each access point can provide wireless connections to a certain number of mobile apparatuses or appliances within a certain spatial range. Access points are interconnected through a backbone network, which is connected to other networks such as the internet. A wireless connection between a mobile apparatus or appliance and an access point is also referred to as a communication channel or a wireless link.

The wireless connection of a mobile apparatus or appliance that moves between a first and a second access point, or rather from the wireless coverage area of the first access point to the wireless coverage area of the second access point, will at some point in time be transferred from the first access point to the second access point. In cellular telecommunications this transfer is referred to as handover, sometimes also as handoff, and relates to the process of transferring an ongoing call or data session of a mobile entity from one communication channel connected to the mobile network operator's core network to another communication channel.

There are different types of handover in cellular telecommunications, including intra-cell handover and inter-cell handovers.

Intra-cell handover occurs when a connection between a mobile entity and the access point is transferred from one antenna of the access point to a different antenna of the same access point, e.g., when the access point employs spatial multiplexing for serving different sectors of its coverage area using different directional antennas, or when a connection is changed to a different frequency or time slot of the same access point.

Inter-cell handover occurs when a connection is transferred from a first access point to a different access point that may be physically separated from the first access point and may be connected to a different point of the backbone network than the first access point from which the connection is transferred.

The point in time when a handover is executed is determined based on the quality of the wireless connection, which is determined using several measures including, inter alia, error rates of the wireless connection. Error rates typically increase with the distance between the mobile entity and the access point, as will the signal travel time. Other factors influencing the error rate may include the number of wireless connections maintained by an access point, interference and the like. Errors that cannot be corrected through error correction mechanism typically require retransmission of data, which may be considered increasing the latency of a connection.

The handover may be controlled by a controller in the network, also referred to as Network Controlled Handover, or NCHO, by the mobile equipment, also referred to as Mobile Controlled Handover, or MCHO, or by the network under assistance of the mobile equipment, also referred to as Mobile Assisted Handover, or MAHO.

In NCHO the channel measurements and the decision when to execute a handover are entirely performed on the network side. NCHO is often found in analogue radio networks.

In MCHO the channel measurements and the decision when to execute a handover are entirely performed by the mobile equipment. MCHO is found, e.g., in DECT and wireless LAN in accordance with older implementations of IEEE 802.11 standard. Newer developments of the IEEE 802.11 standards provide some network control for band steering and access point handover.

In MAHO the channel measurements are performed on both sides of the link. The mobile equipment transfers its measurement results to the network, which uses this data for deciding when to execute the handover. MAHO is used, e.g., in GSM, CDMA, WCDMA, TD-SCDMA and LTE networks.

In any case the handover decision is performed somewhere in the wireless connection layer. The entire route data packets travel between a mobile entity and a processing entity that is connected to the wireless network's backbone and that executes an "outsourced" process may change more or less significantly, depending on the type of handover, intra-cell or inter-cell. While an intra-cell handover most likely does not cause a significant change in the route of the data packets, an inter-cell handover is much more likely to result in such significant change of the route, including an increased number of hops, i.e., data forwarding steps, in network components.

In case processing entities of an edge cloud computing resource are located physically close to and are associated with access points, a handover in the wireless connection may automatically cause a termination of a slave process in the processing entity associated with the access point that hands over the wireless connection. After the handover of the wireless connection a new slave process may be started in the processing entity associated with the access point to which the wireless connection has been handed over.

FIG. 1 shows an exemplary slave process transfer of the "terminate-and-start"-type during a wireless handover, either network-controlled or mobile-controlled, in a system 100 in which processing entities of edge-computing resources 102, 104 are associated with respective wireless access points 106, 108. The master process of mobile apparatus or appliance 110, represented by the vehicle, sends data to the processing entity of the edge-computing resource that is attached to the wireless access point it is connected with, and that executes the corresponding slave process, and receives processed data in return. The wireless coverage areas of the access points are indicated by the dotted line ovals, which overlap for providing uninterrupted wireless communication. In the example in FIG. 1, prior to the handover the mobile apparatus or appliance 110 sends data to a processing entity of edge-computing resource 102 via a wireless access point 106, and receives processed data in return. As the mobile apparatus or appliance 110 moves from the wireless coverage area of wireless access point 106 towards the wireless coverage area of wireless access point 108, at some point a wireless handover will occur, typically where the wireless coverage areas of wireless access points 106 and 108 overlap. Upon the wireless handover being started the processing entity of edge-computing resource 102 will terminate the slave process. Once the wireless handover is completed, mobile apparatus or appliance 110 will start the slave process in a processing entity of edge-computing resource 104 associated with wireless access point 108, send data and receive processed data from that processing entity.

Terminating the slave process in one processing entity and restarting the slave process in another processing entity inevitably takes some time, during which no processing results will be provided to the corresponding master process. Depending on the service this may represent more than a mere inconvenience to the user, most notably in case the slave process requires a fair amount of data before appropriate process parameters are found for providing a useful processing result to the master process. This is particularly important in processes that evolve during execution based on information from continuous input data, like for example machine learning or artificial intelligence applications.

To address the requirements of such type of master-slave processes during a handover of the wireless connection the slave process may be halted rather than terminated, or "frozen", and transferred to a processing entity associated with the wireless access point that provides the wireless connection after the handover, which resumes the processing at the point where it was "frozen". The slave process may be transferred "stateful", i.e., including a set of parameters defining the state of the process at the time of transfer. Once transferred the slave process is resumed rather than started from an initial state, which may eliminate the need for the process to digest a certain amount of data before being ready for outputting meaningful processing results.

FIG. 2 shows an example of transfer of the slave process of the "freeze-and-resume"-type during a wireless handover, either network-controlled or mobile-controlled, in a system 200 in which edge-computing resources 202, 204 are associated with respective wireless access points 106, 108, and in which slave processes, which may be of a more complex nature than those of the example discussed with reference to FIG. 1, are transferred between processing entities of edge-computing resources 202 and 204 along and simultaneously with the wireless handover from wireless access point 206 to wireless access point 208. The initial situation is the same as in FIG. 1: Mobile apparatus or appliance 110 sends data to a processing entity of edge-computing resource 102 via wireless access point 106, and receives processed data in return. As the mobile apparatus or appliance 110 moves from the wireless coverage area of wireless access point 106 towards the wireless coverage area of wireless access point 108, at some point a wireless handover will occur, typically where the wireless coverage areas of wireless access points 106 and 108 overlap. Once the wireless handover to wireless access point 108 is completed, mobile apparatus or appliance 110 will send data to a processing entity of the associated edge-computing resource 204 and receive processed data in return. However, at the same time of the wireless handover, the slave process that was executed in a processing entity of edge computing resource 202 is "frozen" in edge computing resource 202 and transferred to a processing entity of edge computing resource 204, where it is resumed rather than started from an initial state, and continues processing of data, now received from mobile apparatus or appliance 110 via wireless access point 108. The simultaneous nature of the wireless handover and the transfer of the slave process is indicated by the arrows that touch and merge in the middle.

However, even the "freeze-and-resume"-transfer of the slave process may result in significant interruptions of the processing, inter alia due to the wireless handover being the trigger for the transfer, and the handover and the concurrent transfer of the slave process that occur may interrupt the processing of data at an inconvenient point in time.

With wireless handover events controlled from the network layer, changes in the performance of the communication connection between a mobile client and an edge cloud computing resource may occur unexpectedly and at inconvenient times during the processing, and the changes in the performance may be significant.

SUMMARY OF THE INVENTION

It is an aspect of the present invention to provide an improved method of transferring and adapting mobile client-controlled slave processes executed in processing entities of an edge cloud computing layer. It is a further aspect of the present invention to provide a mobile entity, an edge cloud computing layer and a system that are configured to initiate and control transferring slave processes between processing entities of the edge cloud computing layer.

These aspect are attained by a method of initiating a transfer of a slave process by a mobile entity, by a method of controlling a transfer of a slave process in the edge cloud computing layer, and by the apparatuses and systems as presented in the claims.

According to one aspect of the invention, a method of initiating a transfer, of an active first-type slave process that is being executed in a first processing entity of an edge cloud computing layer to a second processing entity of the edge cloud computing layer, is executed in a mobile entity. The first processing entity, along with one or more second processing entities, represent processing resources provided in the edge cloud computing layer. One or more of the processing entities may be provided by the same computing hardware. A plurality of processing entities of the edge cloud computing layer is communicatively connected through a communication network layer. The communication network layer may include wireless access points that provide radio or other wireless access for establishing wireless links with mobile entities, for data communication between master processes executed in the mobile entities and associated slave processes executed in processing entities of the edge cloud computing layer. One or more processing entities and/or computing hardware may be associated, physically or logically, with a wireless access point. A wireless link between a mobile entity and a first wireless access point of the network layer may be subject to a handover to a second access point of the network layer at any time without advance notice or notice of any kind to the mobile entity, the edge cloud computing layer, the master or the slave process.

An active slave process executed in a processing entity of the edge cloud computing layer receives data and/or control information from an associated active master process executed in a first mobile entity, and returns processing results obtained based on the received data and/or the control information to the active master process. Control information may include information instructing or permitting the slave process to obtain data from other sources, including data or processing results from other mobile entities, databases on the internet and the like. Data and/or control information exchange between the master process and the associated slave process is effected, or carried out, through a process sharing connection. The process sharing connection is established in the network layer and includes a section represented by a wireless link between a mobile entity and one or more wireless access points of the network layer.

Accordingly, the active first-type slave process executed in the first processing entity of the edge computing layer receives data and/or control information from an associated active first-type master process executed in the first mobile entity, and returns processing results obtained based on the received data and/or the control information to the active first-type master process. Data and/or control information exchange between the first-type master process and the associated first-type slave process is effected, or carried out, through a first-type slave process sharing connection, which includes a wireless link between the first mobile entity and one or more of a plurality of wireless access points of the network layer.

The expression first-type in the context of master-slave processes and process sharing connections indicates that different types of master-slave processing may exist, which each have different requirements, e.g., in terms of computing power at the mobile entity and the processing entities of the edge cloud computing layer, in terms of properties and/or requirements of the process sharing connection, in terms of the amount of data that is transmitted in either direction, and the like.

A plurality of different types of master processes and process sharing connections may, at least temporarily, exist and be executed simultaneously and independently of each other in a mobile entity, while the corresponding slave processes need not necessarily exist or be executed in the same processing entity or computing hardware of the edge cloud computing layer.

The expression first-type in the context of master-slave processes and process sharing connections also indicates that multiple master processes of the same type and corresponding process sharing connections may, at least temporarily, exist and be executed simultaneously and independently of each other in a mobile entity.

The method comprises, at the first mobile entity, receiving a first heat map relating to the first-type master-slave process. The heat map may be generated in and received from a heat map process located in the edge cloud computing layer, or may be received from a server or database that is communicatively connected to mobile entity through the network layer. The heat map may also be generated by a local heat map process that is active in the mobile entity, and may be received from the local heat map process. Alternatively or in addition, the local heat map process may provide the locally generated heat map to a heat map process active in the edge cloud computing layer or the server or database, and receive a heat map that is generated based upon the data of a plurality of locally generated heat maps from a plurality of mobile entities. Likewise, a mobile entity may receive a heat map from other mobile entities through direct communication. The heat map may be received at any time before further steps of the method are executed. It is, thus, not necessary to receive a heat map each time the further steps of the method are executed.

The heat map provides information relevant to process sharing connections, between mobile entities and second processing entities, for first-type master-slave processes, at least for a first area including a current and/or a future location of the first mobile entity. The information relevant to process sharing connections may include, inter alia, properties of the process sharing connections like a quality of the connections, expected latencies for connections between wireless access points and processing entities, a measure indicating the processing load of processing entities and/or computing hardware of the edge cloud computing layer, the suitedness of processing entities and/or computing hardware of the edge cloud computing layer in case different types or implementations of processing entities are available to choose from, and the like. A value representing the suitedness may be determined based on a number of CPUs and/or GPUs available, characteristics of the operating system and other software, availability and version of specific hardware and/or software that may be required for slave processes, e.g. software libraries, machine learning frameworks, artificial intelligence frameworks, programming interfaces, and the like. Further, the value representing the suitedness may include information about how fast additional hardware and/or software resources of a processing entity at an endpoint of a process sharing connection can be dynamically allocated, if needed. The value representing suitedness may also reflect priorities of other processes executed in a computing hardware, or policies of an operator of the mobile edge computing layer. Heat maps may also include location-related information about likelihood or occurrence of wireless handovers for mobile entities. A value indicating a quality of connections, indicated in a heat map, may be based on availability, data throughput, packet loss, jitter. Other inputs that may be used for determining a value indicating a quality of connections may include occurrences of stalled or interrupted services on connections.

It is obvious that heat maps may be different for different-type process sharing connections, depending on the requirements of the respective master-slave process. For example, one type of master-slave process may require a comparatively small data rate and low latency, while another master-slave process may require a high data rate and may tolerate higher latencies. This may also result in different combinations of wireless links and connecting links in the remaining network layer being ranked differently for each type of master-slave process.

The process further includes ranking, based on a cost function, possible process sharing connections, between the first mobile entity and one or more second processing entities of the edge cloud computing layer, for the current location of the first mobile entity and/or a location of the first mobile entity in the near future.

Cost functions may include or consider, inter alia, knowledge of distances to wireless access points in the area, e.g., from a map, to allow for predicting signal travel times, if low latency is a requirement. Cost functions may also take characteristics of elements and components involved in establishing and/or maintaining process sharing connections into consideration. Such characteristics may include, for example, theoretically supported data rates of segments of the network layer that provide the process sharing connection, properties or capabilities of the wireless terminal equipment, transmit power levels required for establishing and maintaining a wireless connection with one of a multiplicity of wireless access points. Information about characteristics of present wireless connections of mobile entities and/or wireless access points, e.g. transmit power levels, may, for example, in conjunction with location data be used for inferring data rates that are most likely supported in wireless links. Periodic or continuous measurements of process sharing connections may provide data representing data rates, latency, packet loss, jitter and the like. These measurements may be performed end-to-end in a process sharing connection through corresponding cooperating applications or services executed in the mobile entities and the processing entities. Cost functions may yet further also take business-related characteristics of links within the network layer into account, e.g., service level agreements, subscriptions, roaming agreements between wireless network providers, network service providers and/or users of mobile entities. In alternative embodiments, a utility function may be used in place of the cost function, which is placing the process sharing connection having the highest utility highest in the ranking, while one might say that the cost function places that process sharing connection highest in the ranking that has the lowest cost. This may, effectively, result in identical rankings, and cost function and utility function are considered interchangeable throughout this description.

The expression "possible process sharing connections" in the ranking context may include any and all of the process sharing connections that can theoretically be established, logically or physically, between the mobile entity and a processing entity. It goes without saying that the ranking may also consider only a shortened list of possible process sharing connections, excluding those that immediately appear to result in a less-than-optimal connection.

A current location of the first mobile entity may be provided through a navigation system, e.g., GPS, GLONASS, BEIDU, GALILEO or similar systems, through triangulation using wireless access points, a combination thereof, and the like. Locations of the first mobile entity in the near future may be known from an active route navigation of the first mobile entity, from data obtained from a calendar, from analysing recurring activities mapped to a present day and time, or the like.

Further inputs to the cost function may include the current requirements of the active master-slave process and information provided in the heat map. Requirements of master-slave processes may differ depending on the type of master-slave process. Requirements for each type of master-slave process may dynamically vary, while active, for example depending on the mobility context of the mobile entity, as well as on preferences configured by a user, a service provider or an authority.

In an exemplary master-slave process that performs video image analysis for assisted or autonomous driving the mobility context may be a driving context. Variables or values defining the driving context may include driving speed and type of road, priority of master-slave process, and the like.

The priority of a master-slave process may vary dynamically. For example, while driving in an urban area, where the likelihood of pedestrians walking on or next to a road is comparatively high, a master-slave process implementing a vulnerable road user (VRU) safety feature may be assigned a higher priority, while the same master-slave process may be assigned a lower priority on a highway, where the likelihood of pedestrians on or near the road typically is much lower, and where, in addition, a pedestrian typically is usually detectable at a larger distance. Also, on a highway merely detecting a pedestrian may suffice for triggering safety actions, while pedestrians in an urban context may need to be tracked and monitored for predicting their future path in relation to the vehicle's future path.

In an exemplary order or hierarchy of master-slave processes, processes implementing safety-critical and delay-sensitive functions may be ranked highest, followed by processes implementing safety-critical and delay-tolerant functions, processes implementing non-safety-critical and delay-sensitive functions, and finally processes implementing non-safety-critical and delay-tolerant functions.

The method further includes determining, based on the ranking, one or more second processing entities of the edge cloud computing layer as potential target entities to transfer the first-type slave process to.

The process yet further includes transmitting a processing entity transfer request to a control process executed in the edge cloud computing layer. The request includes an identification of the active first-type slave process and indicates at least one of the one or more second processing entities determined, based on the ranking, as potential target to transfer the active first-type slave process to.

The control process may be centralized, or executed regionally, i.e., covering a certain area, with regional control processes being connected, controlled and/or synchronized through a higher layer supervisor process.

In embodiments or developments, the mobile entity may access a coverage map indicating the coverage areas of wireless access points available within an area including a current location of the mobile entity and/or within locations at which the mobile entity will be in the near future.

In embodiments or developments, the method further comprises determining present conditions of process sharing connections, between mobile entities and processing entities, for active first-type master-slave processes, within an area including a current location of the first mobile entity and/or within locations at which the first mobile entity will be in the near future. The method yet further includes performing the ranking based on information provided in the received heat map and the present conditions of the process sharing connections.

Determining the present conditions includes determining the present condition of the process sharing connection for the first-type master-slave process of the first mobile entity.

Conditions of process sharing connections may be represented by values of parameters, measured and/or estimated, characterizing the process sharing links, including data rate, time required for data packets to arrive at their respective destinations, error rates, and the like.

The present condition of a process sharing connection for a master-slave process of any type may be determined by a connection condition determining process executed in the mobile entity, in the edge cloud computing layer, e.g., in the processing entity executing the slave process of the respective master-slave process, or by two communicatively coupled processes executed on both the mobile entity and the edge cloud computing layer. In the latter case, the connection condition determining process executed in the mobile entity may determine the connection condition of the wireless link between the mobile entity and the wireless access point, and the connection condition determining process executed in the edge cloud computing layer may determine the connection condition of the link section between the wireless access point and the processing entity. In case multiple slave processes are executed simultaneously in multiple processing entities of the edge cloud computing layer that have different link sections between the wireless access point and the respective processing entity a single connection condition determining process executed in the edge cloud computing layer may be active, or a multiplicity of such connection condition determining processes may be active, e.g., one for each communication link terminating at a processing entity.

Embodiments or developments comprising these additional features may be useful for deferring an impending transfer of a slave process, or for providing a ranking of processing entities reflecting current performances of process sharing connections.

In embodiments or developments, the method further comprises receiving a second heat map relating to master-slave processes of a second type, execution of which is shared between mobile entities and processing entities of the edge cloud computing layer, and that may compete for the same processing and/or communication resources. The second heat map may provide information for a second area at least including the current location of the mobile entity. The method yet further comprises performing the ranking based on the first and the second heat map.

The second heat map may be received from a process executed in the edge cloud computing layer, or from a second mobile entity that is within wireless communication range of the first mobile entity, and with which a wireless communication is at least temporarily established.

The second area including the current location of the mobile entity may differ from the first area that is covered by the first heat map. However, the first and the second areas overlap at least at the current location of the first mobile entity. The extent of overlap of the first and second areas may be considered in the ranking.

In embodiments or developments, the method further comprises transmitting the determined present condition of a process sharing connection for at least the active first-type master-slave process to the heat map process.

In embodiments or developments, the method further comprises transmitting, in the processing entity transfer request, a compute resource desired or required for executing the first-type slave process.

This embodiment or development may facilitate dynamically adjusting the ratio of sharing of the master-slave process between the mobile entity and the processing entity of the edge cloud computing layer. An adaptation of the sharing ratio, increasing or decreasing the share of the slave process in the overall master-slave process, may be desirable, e.g., for reflecting changing conditions of the mobile entity or its near environment, or for reflecting a changing performance, capability or capacity of a process sharing connection. Transmitting an indication of a desired or required compute resource may facilitate the decision, to which of the second processing entities of the edge cloud computing layers a slave process is eventually transferred. Also, this may increase the "fairness" of the distribution of processes in the edge cloud computing layer.

In embodiments or developments, the method further comprises receiving a maximum available compute resource available for the first-type slave process at least for the second processing entities indicated in the request. The maximum available compute resource may provide information about capabilities, capacities of a processing entity to which the slave process could be transferred. Such information may include details on the hardware or the software of the processing entity, or a descriptive profile of the processing entity. In response to the received maximum available compute resource, the mobile entity may adjust the load sharing between the master process and the slave process, or reconfigure the master-slave process, and either transmits a message accepting the transfer, cancels the processing entity transfer request, transmits a time delay for the original transfer request that indicates a modified time period of validity for the original request, or accepts a transfer to a second processing entity not specified in the original request.

Reconfiguring the master-slave process may include downgrading the function or service provided in the mobile entity, e.g., by accepting a degraded performance, notifying a user that a service will temporarily or permanently not be available at the expected service level or at all, or the like.

Adjusting the load sharing by reducing the share of the processing of the master-slave process executed in the processing entity of the edge cloud computing layer and increasing the share of the processing executed in the mobile entity may be accompanied by a reduction of the processing capacity of the mobile entity that is made available to other processes, e.g., of processes having a lower priority.

These embodiments or developments may allow for flexibly reacting and adapting to adverse conditions in the edge cloud computing layer, e.g., high processing load in certain areas, high load on parts or sections of the network layer, or the like.

In embodiments or developments, the method further comprises receiving, from one or more second mobile entities within the first area, information relating to conditions of their respective process sharing connections, and performing the ranking based on information provided in the received first heat map and the received information relating to conditions of second mobile entities' process sharing connections.

The information relating to conditions of process sharing connections provided by the one or more second mobile entities may relate to first-type master-slave processes, but may also relate to other types of master-slave processes.

The information may be received through direct communication between mobile entities, including communication forwarded by other mobile entities within the first area, or through an intermediate information broker. Such information broker may be located in the network layer or in the edge cloud computing layer, and may be of conventional design. The information exchange may occur in regular time intervals and/or triggered at any time a process in a mobile entity determines that an exchange may be necessary, e.g., if an actual condition of a process sharing connection differs significantly from a condition expected based on the heat map.

In embodiments or developments, the method further comprises receiving, from one or more second mobile entities within the first area, information relating to their respective first-type master-slave processes, identifying, from the received information relating to the first-type master-slave processes of the one or more second mobile entities, input data common to the input data of the first-type master-slave process of the first mobile entity, and receiving processing results of the first-type slave process from a second mobile entity or from the processing entity assigned to the second mobile entity, or providing processing results of the first-type slave process to a second mobile entity.

Embodiments or developments implementing these features may reduce the processing load on processing entities of the edge cloud computing layer by at least temporarily sharing processing results based on the same or sufficiently similar input data. This may be useful, for example, in situations in which a plurality of mobile entities are within a close range or distance from each other and move in a common direction.

According to another aspect of the invention, a method of controlling a transfer of an active first-type slave process executed in a first processing entity of an edge cloud computing layer to a second processing entity of the edge cloud computing layer comprises, at a control process executed in the edge cloud computing layer, receiving, from a first mobile entity, a slave process transfer request, wherein the request indicates one or more processing entities of the edge cloud computing layer as possible targets to transfer the active first-type slave process to. The request may also indicate required compute resources for the active first-type slave process. If the request does not include required compute resources, the information may be obtained from the processing entity that currently executes the slave process that is to be transferred.

The control process executed in the edge cloud computing layer may be a central process that manages and/or coordinates the transfer of a plurality of slave processes, or may be a localized process, e.g., an auxiliary process associated with a slave process. In any case the control process must be adapted to communicate with compute resources hosting one or more process entities, or with management processes associated with the compute resources, for negotiating and initiating a transfer of a slave process.

A required compute resource in this context may relate to a general-purpose computer or processor, but may also specify required dedicated processing arrangements for specific purposes, e.g., GPUs, which can be used for parallel processing of massive amounts of data of similar type. The required compute resource may also indicate a software framework or specific libraries that may be necessary for instantiating and executing the slave process.

The method executed in the edge cloud computing layer further comprises determining properties at least of the processing entities of the edge cloud computing layer indicated in the request, within a time window extending into the future that includes the current time. The properties may be representative of the suitedness of the respective processing entity for executing the slave process that is to be transferred. The properties may include, e.g., a current processing load on the processing entities, estimations of capacities that will be available within the time window and/or shortly after the end of the time window, and the like. The estimation may be made based on slave process transfer requests received from other mobile entities, which are requesting a transfer away from the processing entities indicated in the request. Determining the properties may also include verifying, if a compute resource has sufficient processing or computing power available for providing a desired or required load sharing ratio. This may be useful for negotiating with the requesting mobile entity a different sharing ratio, if insufficient processing or computing power is available during the time window. If no desired or required processing or computing power is indicated in the request, it may be assumed that the slave process is to be transferred at its current requirements.

The method executed in the edge cloud computing layer yet further comprises ranking at least the processing entities of the edge cloud computing layer received in the request in accordance with the current and/or future properties, and transferring the active slave process to the process entity having the highest rank, if the targeted process entity has been indicated in the request.

In embodiments or developments, the method executed in the edge cloud computing layer further comprises, if none of the process entities indicated in the request provides sufficient compute resources for accepting the request, returning, from the control process to the mobile entity, a response message comprising a maximum available compute resource for at least the processing entities indicated in the request. The mobile entity may, in response thereto, select a processing entity indicated in the response message and transmit the selection to the control process. The control process then transfers the slave process in accordance with the selection. The selection may include a new sharing ratio for the master-slave process, which will be considered when transferring the slave process. This may be used in case the sharing ratio is not continuously variable, but rather in fixed increments or steps.

Alternatively, the control process may receive a cancellation of the transfer request from the mobile entity.

A mobile entity according to a further aspect of the invention comprises a microprocessor, a memory, e.g., random access memory and read only memory, and a wireless communication interface, wherein the memory stores program instructions which, when executed by the microprocessor, configures the mobile entity to execute the method of one or more of claims 1 to 10.

An edge cloud computing layer according to yet another aspect of the invention comprises physical and/or logical processing entities that are communicatively connected with each other through a network layer. The processing entities may be placed at different spatial locations. The network layer further provides wireless communication means for establishing communication connections between mobile entities and processing entities. The edge cloud computing layer executes one or more control processes that are configured to initiate, maintain and transfer a plurality of slave processes on or between processing entities, respectively, in response to requests received from mobile entities in accordance with the methods described further above.

BRIEF DESCRIPTION OF THE DRAWINGS

In the following section, exemplary embodiments of the invention will be described with reference to the attached drawings. In the drawings

In the figures, identical or similar elements may be referenced using the same reference signs.

DETAILED DESCRIPTION OF EXEMPLARY EMBODIMENTS

Figure 1:
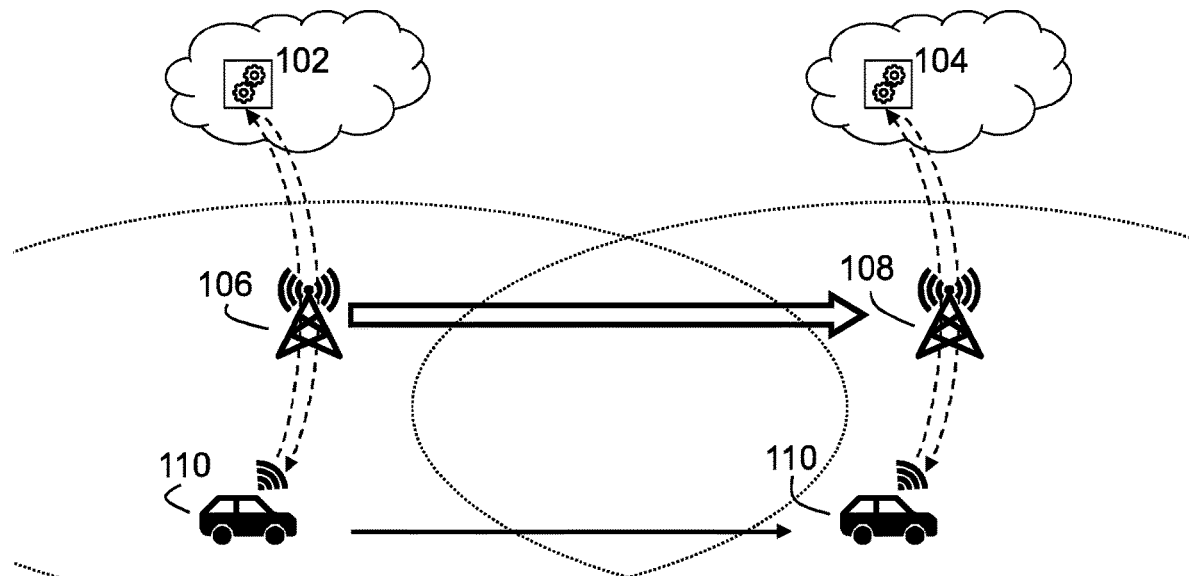
FIG. 1 shows an exemplary slave process transfer of the "terminate-and-start"-type during a wireless handover.
Figure 2:
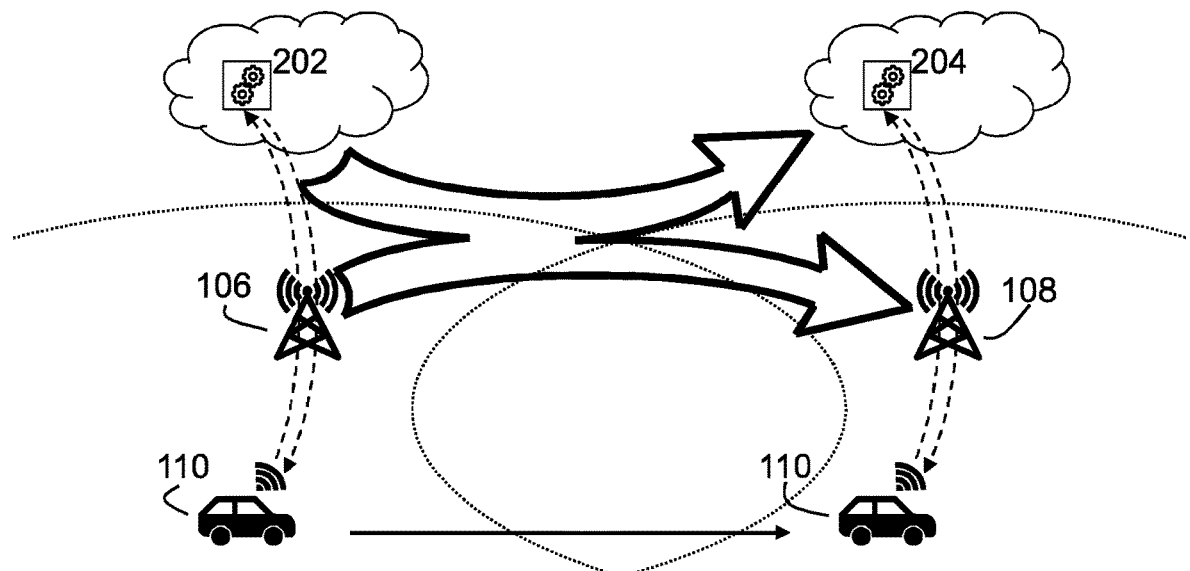
FIG. 2 shows an exemplary slave process transfer of the "freeze-and-resume"-type during a wireless handover.

FIGS. 1 and 2 have been described in detail further above in relation to known methods and will not be referred to in this section.

Figure 3:
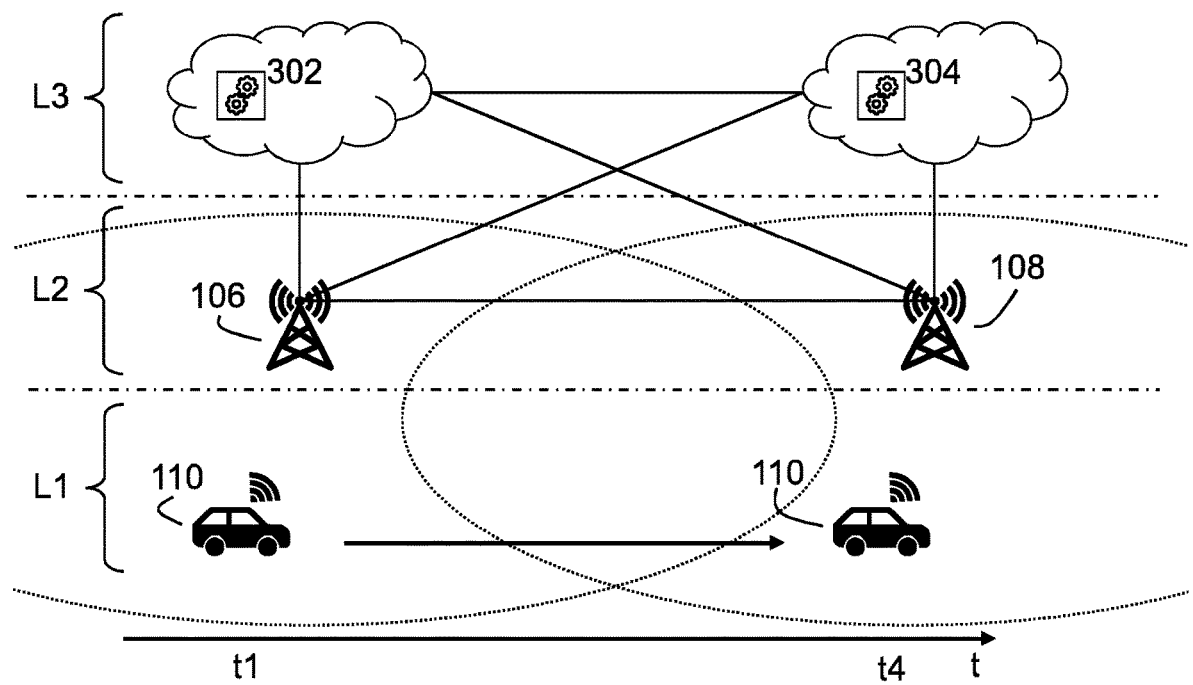
FIG. 3 shows three basic layers of the overall system in which the present methods are executed.

FIG. 3 shows three basic layers of the overall system 300 in which the present methods are executed. The bottom layer or user layer, L1, is the layer in which the mobile entities are present. Mobile entities may, for example, be handheld mobile devices, vehicles and the like. In the figure a vehicle 110 is shown at two different time instants, t1 and t4, as it moves in an area covered by a wireless network. The top layer, L3, is the edge cloud computing layer, in which compute resources provide processing entities 302, 304 that are configurable for processing slave processes associated with corresponding master-processes that are executed in mobile entities. The compute resources are interconnected with each other through a network layer, L2, which is the middle layer between the bottom and top layers. The network layer connects mobile entities in the user layer L1 with processing entities of the edge cloud computing layer L3. The network layer comprises a plurality of wireless access points 106, 108 for providing wireless communication links for mobile entities in the user layer within their respective coverage areas. The coverage areas are indicated by the dotted ovals. The coverage areas overlap, allowing for handing over active communication connections without interruption or with as little interruption as possible. To this end the wireless access points 106, 108 are interconnected. Handover of mobile entities between wireless access points may be controlled by the network layer.

Figure 4:
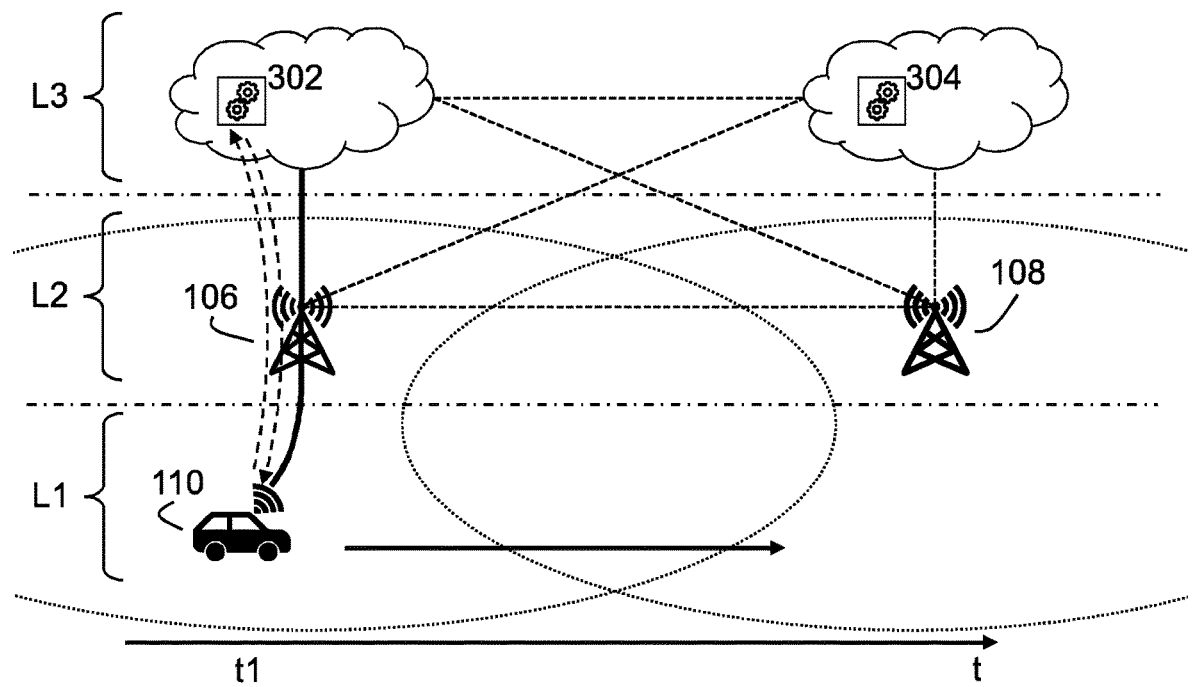
FIG. 4 shows a route of a process sharing connection between an active master-process executed in a mobile entity and a slave process executed in processing entity at a first time instant.

FIG. 4 shows a route, within system 300, of a process sharing connection 106 between an active master-process executed in mobile entity 110 and a slave process executed in processing entity 302 at a first time instant t1. The process sharing connection 106 is indicated by the dashed arrows connecting mobile entity 110 and processing entity 302. The two arrows point in opposite directions, indicating that a bi-directional communication is available. Process sharing connection 106 includes a wireless segment, extending from mobile entity 110 to wireless access point 106, and a further segment, wired or wireless, that extends from wireless access point 106 to processing entity 302. The route is indicated by the bold solid line connecting mobile entity 110 and processing entity 302.

Figure 5:
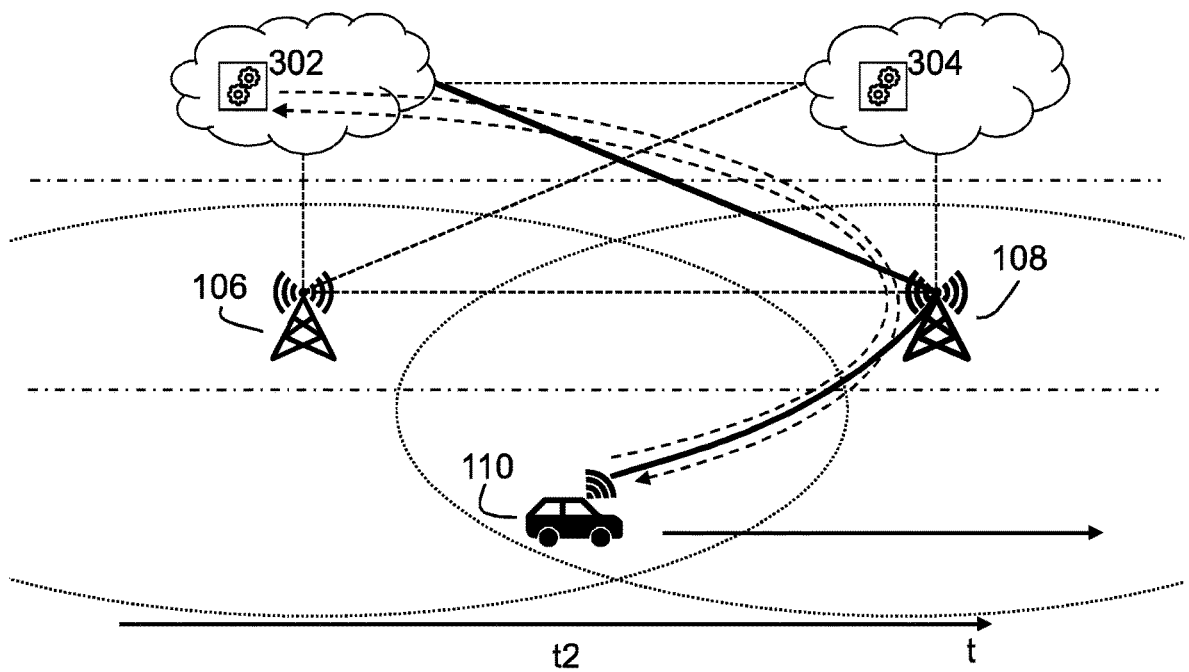
FIG. 5 shows a route of a process sharing connection between an active master-process executed in a mobile entity and a slave process executed in processing entity at a second time instant.

FIG. 5 shows a situation, within system 300 and in accordance with the methods presented herein, in which, at time instant t2, the mobile entity 110 is within the wireless coverage areas of both wireless access points, 106 and 108, and after a wireless handover has occurred. A transfer of the slave process from processing entity 302 to another processing has not occurred. The process sharing connection now connects mobile entity 110 and processing entity 302 through a new route, indicated by the bold solid line connecting mobile entity 110 and processing entity 302. A wireless segment of the new route now extends between mobile entity 110 and wireless access point 108, and a further segment within the network layer connects wireless access point 108 and processing entity 302. As a wireless handover may be considered without significant interruption of the connection, the process sharing connection may be considered continuous through the wireless handover. However, due to a larger distance between the processing entity 302 and the wireless access point 108, and an unknown number of intermediate network components in the network layer that may handle or process data packets along part of the route, the latency of the connection may have increased. This may be compensated by a transfer of the active slave process from processing entity 302 to processing entity 304, which may be attached to wireless access point 108 or may be connected thereto via a connection having lower latency.

In accordance with the methods presented herein, the transfer of the active slave process may be prepared and initiated by the mobile entity 110, based on information concerning the operation of the mobile entity that are unknown to any entity or process of the network layer or of the edge cloud computing layer. The mobile entity may, for example, initiate the transfer when moving at a reduced speed or even not moving at all, or at a time when a master-slave process, execution of which is shared between the mobile entity and a processing entity of the edge cloud computing layer, does not have to process large amounts of data, or the like.

Figure 6:
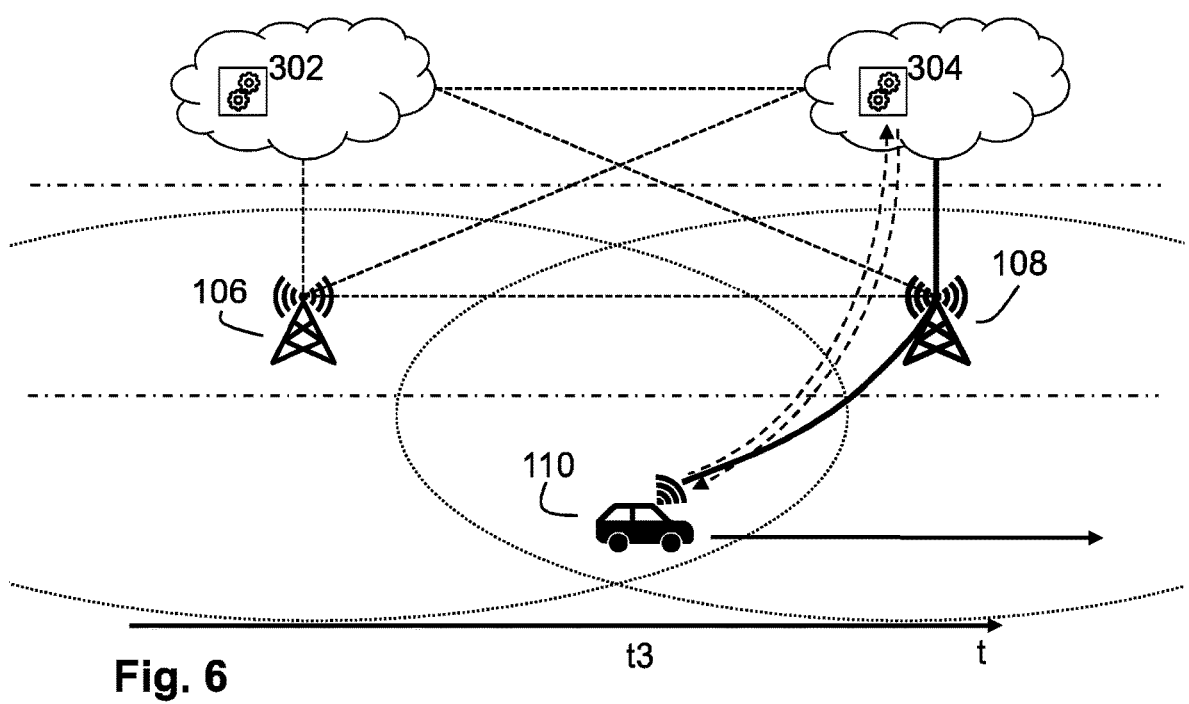
FIG. 6 shows a route of a process sharing connection between an active master-process executed in a mobile entity and a slave process executed in processing entity at a third time instant.

FIG. 6 shows the situation, within system 300 and in accordance with the methods presented herein, in which, after the wireless handover at time instant t2, mobile entity 110 has requested the transfer of the slave process from processing entity 302 to processing entity 304 at time instant t3. While the wireless segment of the route still extends between mobile entity 110 and wireless access point 108, a further segment within the network layer now connects wireless access point 108 and processing entity 304.

The sequence of FIGS. 4 to 6 demonstrates the elastic nature of the transfer of the slave process from one processing entity of the edge cloud computing layer to another, independent from wireless handovers in the network layer. At some point in time, the transfer of the slave process "snaps" the slave process to a processing entity, for which the process sharing connection provides the desired or required conditions or properties, similar to a rubber band that jumps over a small bump to assume a more relaxed state when the tension rises.

Figure 7:
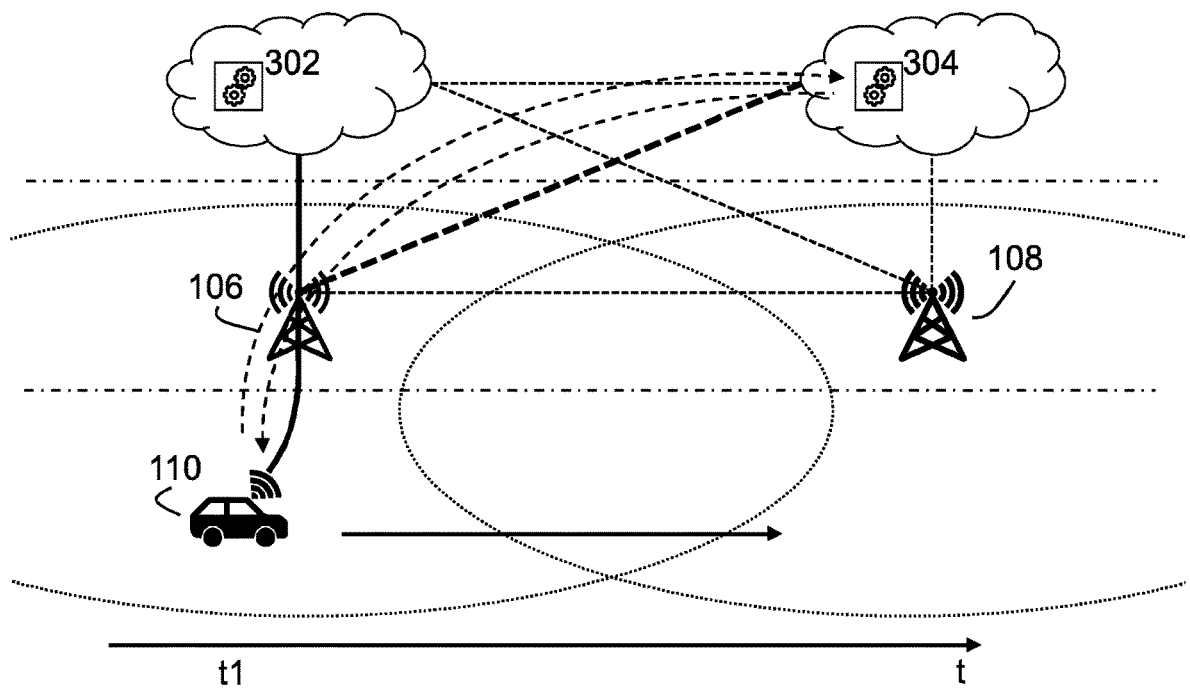
FIG. 7 shows an alternative transfer of the slave process from a first processing entity to a second processing entity.

FIG. 7 shows an alternative transfer of the slave process, within the system 300 and in accordance with the methods presented herein, in which, prior to the wireless handover (see FIG. 5, time instant t2), mobile entity 110 requests the transfer of the slave process from processing entity 302 to processing entity 304. Mobile entity 110 may use prior knowledge of wireless coverage areas and a planned route to issue such advance request at a suitable point in time, e.g., when moving at a reduced speed or even not moving at all, or at a time when a master-slave process, execution of which is shared between the mobile entity and a processing entity of the edge cloud computing layer, does not have to process large amounts of data, or the like. In the figure the present route is indicated in the bold solid line, similar to the situation shown in FIG. 4, and the new route section is shown in the bold dashed line.

Exemplary sequences of wireless handovers and transfers of slave processes in a more realistic scenario will be elucidated with reference to FIGS. 8 to 11.

Figure 8:
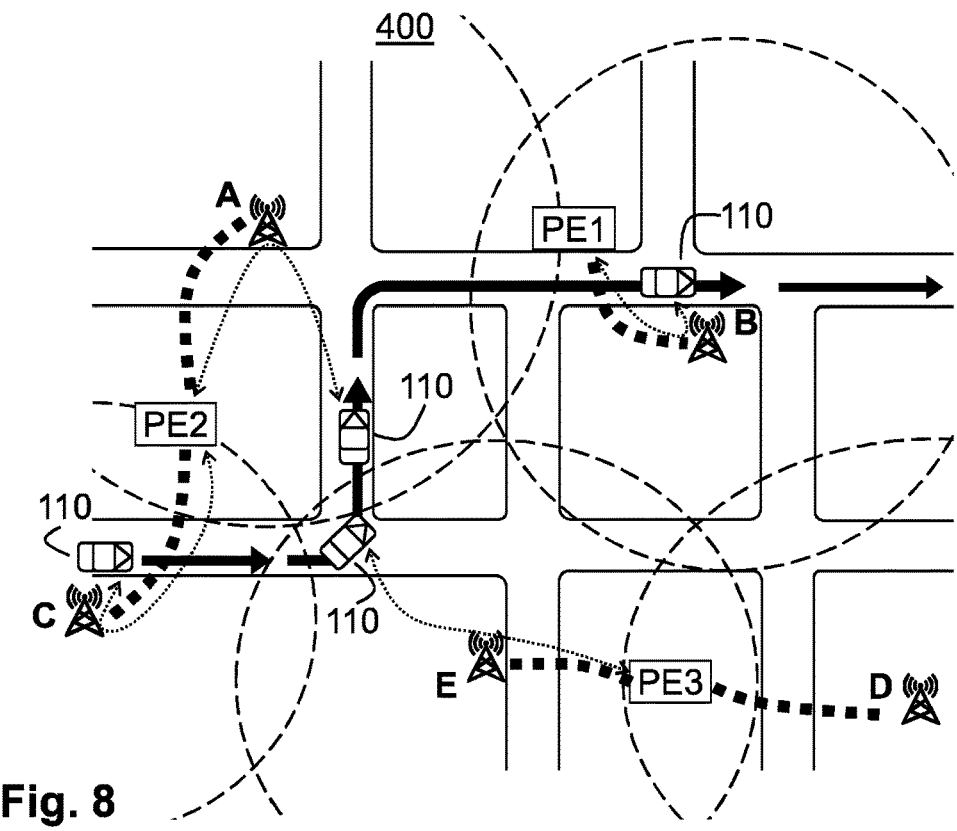
FIGS. 8 to 11 show exemplary transfers of slave processes and paths of process sharing connections for a mobile entity moving in an urban context.

FIG. 8 shows a mobile entity 110 that travels within an urban area 400 along a predetermined path, for example a path that is determined by a navigation system of a vehicle. The predetermined path is indicated by the bold solid arrows, and may be calculated based on traffic conditions, and may also consider delays from traffic lights, for a plurality of alternative paths. Wireless access points A, B, C, D and E are distributed across the urban area to provide more or less gapless wireless communication coverage. The coverage area of each wireless access point is indicated by the dashed oval centred around each wireless access point. The overlapping zones of the wireless coverage areas are the zones where the network layer will perform a wireless handover from one wireless access point to another wireless access point. Processing entities PE1, PE2 and PE3 are likewise distributed across the urban area.

In the example shown in FIG. 8, wireless access points and processing entities are fixedly associated with each other, indicated by the bold dotted lines connecting wireless access points and processing entities, and a wireless handover will cause a transfer of the slave process to the processing entity associated with the new wireless access point. Such transfer may be of the "terminate-and-start"-type or the "freeze-and-resume"-type discussed further above.

Initially, mobile entity 110 has a wireless link with wireless access point C. Wireless access point C has a fixed association with processing entity PE2, which executes the slave process of mobile entity 110. The process sharing connection thus is routed via wireless access point C to processing entity PE2, indicated by the double-pointed dotted arrow. As mobile entity 110 moves on, a wireless handover to wireless access point E occurs just before the T-junction, at which mobile entity 110 is about to turn left, following the path determined by a navigation system of mobile entity 110. Along with the wireless handover to wireless access point E, the slave process is terminated in processing entity PE2 and started in processing entity PE3, which is associated with wireless access point E. The process sharing connection thus is now routed via wireless access point E to processing entity PE3, again indicated by the double-pointed dotted arrow. Right after turning left at the T-junction a wireless handover of mobile entity 110 to wireless access point A occurs. Wireless access point A has processing entity PE2 associated with it, and so the slave process is stopped in processing entity PE3 and started again in processing entity PE2. The process sharing connection is now routed via wireless access point A to processing entity PE2, yet again indicated by the double-pointed dotted arrow. As mobile entity 110 moves on following the predetermined path, a wireless handover to wireless access point B occurs. The slave process is stopped in processing entity PE2 and started in processing entity PE1, which is associated with wireless access point B. The process sharing connection is now routed via wireless access point B to processing entity PE1. In total, three wireless handovers and three terminations and starts of the slave process occur, including one "bounce back" to a processing entity that has previously executed the slave process. Clearly, this can be rather inefficient and causes additional data traffic overhead just for terminating and starting the slave process.

Figure 9:
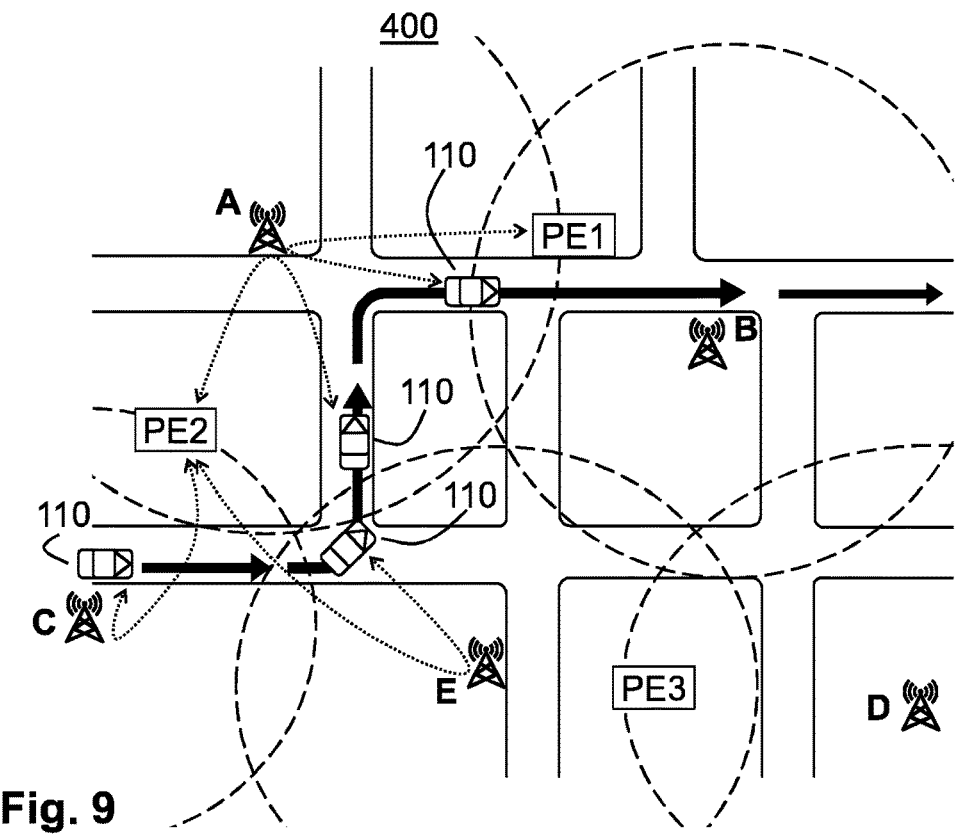

An exemplary sequence of wireless handovers and transfers of slave processes in accordance with the methods presented herein in the more realistic scenario introduced in FIG. 8 will be discussed in the following with reference to FIG. 9. In this example it is assumed that all processing entities are connected with each other through a network layer that is also connected to the wireless access points. It is also assumed that a control process is executed in an edge cloud computing layer that comprises the processing entities, and that is configured to execute the methods for controlling the transfer of slave processes presented herein. It is further assumed that mobile entity 110 is configured to execute the methods for initiating the transfer of slave processes presented herein.

As in the example discussed with reference to FIG. 8, initially, mobile entity 110 has a wireless link with wireless access point C. Wireless access point C has a fixed association with processing entity PE2, which executes the slave process of mobile entity 110. The process sharing connection thus is routed via wireless access point C to processing entity PE2, indicated by the double-pointed dotted arrow. As mobile entity 110 moves on, a wireless handover to wireless access point E occurs just before the T-junction, at which mobile entity 110 is about to turn left, following the path determined by a navigation system of mobile entity 110. However, in accordance with the methods presented herein, mobile entity 110 has knowledge about impending wireless handovers along its path through the urban area 400, e.g., through information provided in a map, data set, or the like. Mobile entity 110 will, therefore, not request a transfer of the slave process upon the first handover from wireless access point C to wireless access point E, because it anticipates the upcoming wireless handover from wireless access point E to wireless access point A, which offers a process sharing connection with processing entity PE2 having the same short latency as the initial process sharing connection. Mobile entity 110 will accept a brief period in which a process sharing connection may have a longer latency, while having a wireless connection with wireless access point E. This may be tolerable because mobile entity 110 will be slower when turning left at the T-junction, leaving more time for processing data required by functions for assisted or autonomous driving. The process sharing connection thus is now briefly routed via wireless access point E to processing entity PE2, and after the wireless handover to wireless access point A it is routed via wireless access point a to processing entity PE2, as indicated by the double-pointed dotted arrows. The slave process remains at processing entity even though a number of wireless handovers have occurred. As mobile entity 110 continues along its path, it may initiate a transfer of the slave process to processing entity PE1 any time before or after a wireless handover to wireless access point B, e.g., depending on the traffic situation and the requirement for a lowest possible latency. As shown in FIG. 9, the transfer of the slave process from processing entity PE2 to processing entity PE1 may be initiated, by mobile entity 110, just before a wireless handover from wireless access point A to wireless access point B will occur, for example, when the amount of data to be processed is low for a period of time because mobile entity 110 stops at a traffic light at the T-junction. The process sharing connection thus is now briefly routed via wireless access point A to processing entity PE1, and after the wireless handover to wireless access point B it is routed via wireless access point B to processing entity PE1.

In this example, the slave process has been transferred only once, despite the wireless links having changed three times.

Figure 10:
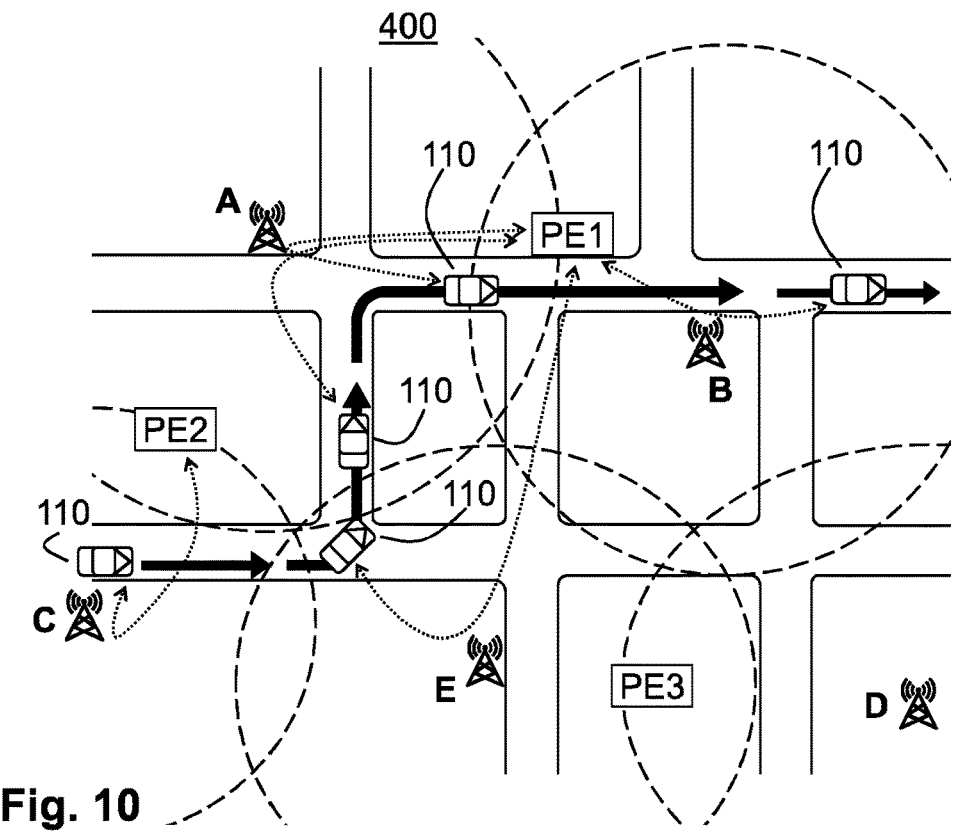

In another example shown in FIG. 10, processing entity PE2, to which mobile entity 110 is initially connected, has a relatively high processing load and may not be capable to provide a desired load sharing ratio. The heat map received by mobile entity 110 indicates that processing entity PE1 should be capable of providing the desired load sharing ratio. Mobile entity 110 thus requests a transfer to processing entity PE1 at a suitable point in time, e.g., when making the left turn at the T-junction. The slave process will be transferred accordingly and mobile entity 110 will not request any further transfer soon, even though the wireless link will be handed over a number of times. In this scenario mobile entity 110 may indicate fallback choices in the request, e.g., allowing transfer of the slave process to processing entity PE3 in case processing entity PE1 currently also has a high processing load that would not permit the desired sharing ratio.

In this example, in addition to the slave process having been transferred only once, despite the wireless links having changed three times, the inventive methods permitted to select a processing entity that provided the desired or required load sharing ratio, and thus provided the best performance of the master-slave process.

Figure 11:
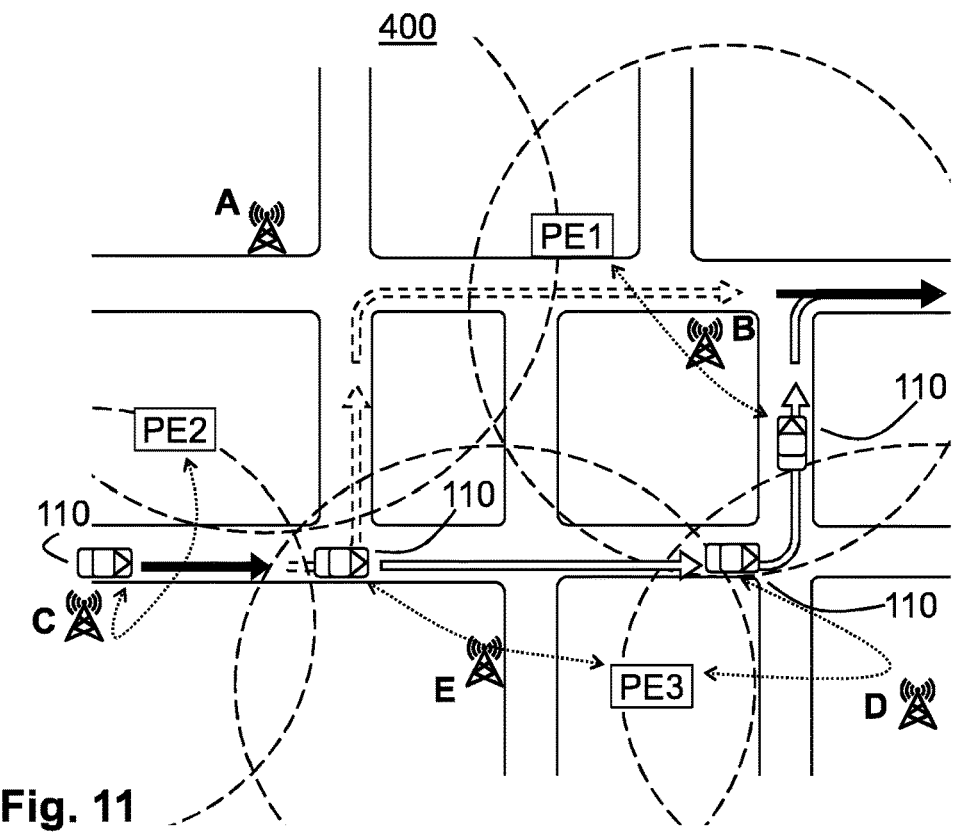

In another example presented with reference to FIG. 11 the heat map or actual data received by mobile entity 110 indicate that processing entities PE1 and PE2 have a high processing load, which may not permit load sharing ratios that are sufficient for the master-slave process to provide an acceptable performance. Also, the wireless links with wireless access points A and B may be heavily loaded, affecting the performance of the load sharing connections routed via these wireless access points. Processing entity PE3, however, is capable to provide the required load sharing ratio, and wireless access points E and D may provide wireless links that promise load sharing connections having the required performance. In this example, the information about the capacity of processing entities within an area and the performance of possible process sharing connections is used to determine a new path for mobile entity 110. Rather than turning left at the T-junction, as in the previous examples, mobile entity 110 may continue straight and turn left only two blocks later, indicated by the white bold arrows, and then turns right and continues on the original path. Mobile entity 110 thus requests a transfer of the slave process to processing entity PE3, and the wireless link will be handed over to wireless access point E. The process sharing connection is now routed to processing entity PE3 via wireless access point E. Prior to turning left a further wireless handover of mobile entity 110 will occur, this time to wireless access point D. Wireless access point D offers a process sharing connection that has a performance sufficient for the requirements of the master-slave process, and thus the slave process remains at processing entity PE3. At this time the processing load of processing entity PE1 may have decreased, such that now the slave process may be transferred to processing entity PE1. Such expected availability of processing capacity may also be deduced from the received heat map. The transfer may then be requested once the next wireless handover, to wireless access point B has occurred or is immediately impending. Mobile entity 110 may reserve the processing capacity for its slave process prior to actually sending the transfer request, knowing that it will soon issue the request.

In this example, the priority of safe execution of master-slave processes, e.g., for autonomous driving or safety-relevant functions, over a planned path for mobile entity 110 has led to a change in the mobile entity's path, irrespective of a possible negative effect on the travel time.

In all of the examples provided above it is also possible to transfer slave processes of different functions having different requirements as to processing power, load sharing ratio, performance of the process sharing connection, and the like, to different processing entities at different times. For example, functions being less sensitive to latency on a process sharing connection may be transferred to processing entities that, over a certain time period, will be connected via wireless access points and network connections that, despite wireless handovers, provide a process sharing connection that is performing just right for the corresponding function. This may reduce the overall number of transfers of slave processes and thereby enhance the system's performance.

Figure 12:
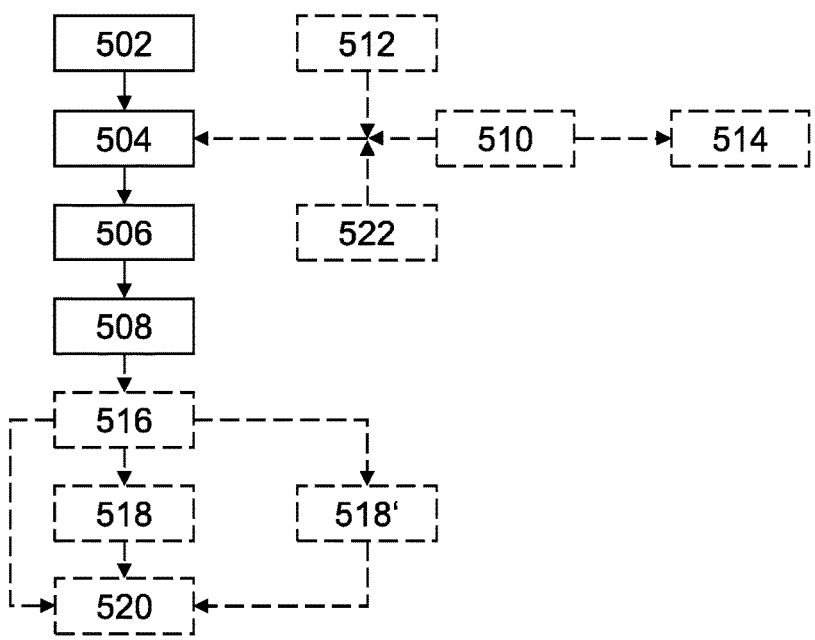
FIG. 12 shows a simplified flow diagram of aspects of the present method executed in a mobile entity.

FIG. 12 shows a simplified flow diagram of aspects of a method 500 of initiating a transfer of an active first-type slave process executed in a first processing entity 302 of an edge cloud computing layer L3 to a second processing entity 304 of the edge cloud computing layer L3, executed in a first mobile entity 110. In step 502 a heat map relating to the first-type master slave process is received. The heat map provides information relevant to process sharing connections between mobile entities and processing entities, in particular second processing entities, of the edge cloud computing layer L3, at least for a first area including a current or future location of the first mobile entity 110. In step 504 a ranking of possible process sharing connections, between the first mobile entity 110 and one or more second processing entities 304, for the current location of the first mobile entity 110 and/or a location of the first mobile entity 110 in the near future is performed, based on a cost function. Next, in step 506, one or more second processing entities 304 are determined as potential target processing entities to transfer the first-type slave process to, based on the ranking. Eventually, in step 508, a processing entity transfer request is transmitted to a control process executed in the edge cloud computing layer L3. The request includes an identification of the active first-type slave process and indicates at least one of the one or more second processing entities 304 determined, based on the ranking, as potential target to transfer the active first-type slave process to.

In optional embodiments the method 500 further comprises, in step 510, determining present conditions of process sharing connections, between mobile entities, including the first mobile entity 110, and processing entities 302, 304 of the edge cloud computing layer L3, for active first-type master-slave processes, within an area including a current location of the first mobile entity 110 and/or within locations at which the first mobile entity 110 will be in the near future. In this embodiment the ranking performed in step 504 is also based on the present conditions of the process sharing connections.

In optional embodiments the method 500 further comprises, in step 512, receiving a second heat map relating to master-slave processes of a second type, execution of which is shared between mobile entities and processing entities of the edge cloud computing layer L3, and that may compete for the same processing and/or communication resources, the second heat map providing information for a second area at least including the current location of the mobile entity. In this embodiment the ranking performed in step 504 is also based on the second heat map.

In optional embodiments the method 500 further comprises, in step 514, transmitting the determined present conditions of a process sharing connection for at least the active first-type master-slave process to a heat map process, for updating heat maps.

In optional embodiments the method 500 further comprises, in step 508, transmitting, in the processing entity transfer request, a compute resource desired or required for executing the first-type slave process.

In optional embodiments the method 500 further comprises, in step 516, receiving 516 a maximum available compute resource available for the first-type slave process at least for the second processing entities indicated in the request. In step 518 of this embodiment the method comprises, in step 518, adjusting the load sharing between the master and the slave process, or reconfiguring, in step 518', the master-slave process. In step 520 a message is transmitted for accepting the transfer, in particular under the conditions of the received maximum available compute resource and after adjusting or reconfiguring. Alternatively, a message may be transmitted for cancelling the processing entity transfer request, skipping steps 518 or 518'. In another alternative a message may be transmitted for transmitting a time delay for the original transfer request that indicates a time period of validity for the request, in particular an extended time period, likewise skipping steps 518 or 518'. In yet another alternative a message may be transmitted for accepting a transfer to a second processing entity not specified in the request, in response to the received maximum available compute resource, either skipping steps 518 or 518' or adjusting load sharing ratio or reconfiguring the master-slave process in this context.

In optional embodiments the method 500 further comprises, in step 522, receiving, from one or more second mobile entities within the first area, information relating to conditions of their respective process sharing connections. In this embodiment the ranking performed in step 504 is also based on the received information relating to conditions of second mobile entities' process sharing connections.

One or more of the optional embodiments described hereinbefore may be executed in combination.

Figure 13:
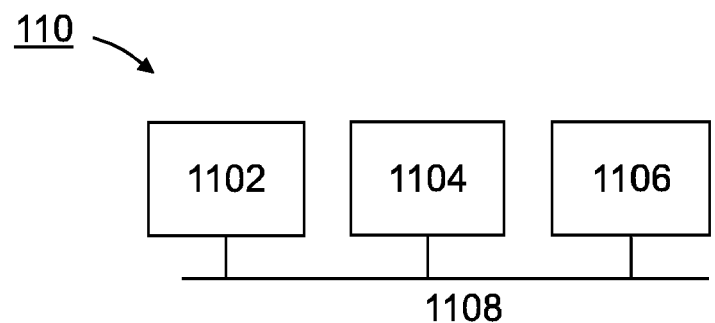
FIG. 13 shows a simplified exemplary block diagram of elements of a mobile entity configured to execute aspects of the present method.

FIG. 13 shows a simplified exemplary block diagram of elements of a mobile entity 110 configured to execute aspects of the present method. A microprocessor 1102, associated memory 1104 and a wireless communication interface 1106 are communicatively coupled via one or more data buses 1108. The memory 1104 may include RAM and non-volatile memory, and may store computer program instructions which, when executed by the microprocessor 1102, configures the mobile entity 110 to execute one or more embodiments of aspects of the present method.

Figure 14:
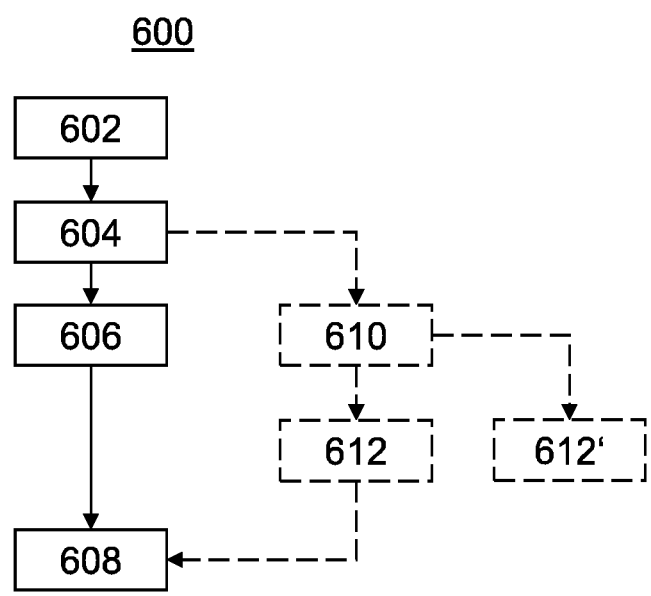
FIG. 14 shows a simplified flow diagram of aspects of the present method executed in the edge cloud computing layer.

FIG. 14 shows a simplified flow diagram of aspects of a method 600 of controlling a transfer of an active first-type slave process executed in a first processing entity 302 of an edge cloud computing layer L3 to a second processing entity 304 of the edge cloud computing layer executed in the edge cloud computing layer L3. In step 602, a slave process transfer request generated in accordance with one or more embodiments as described hereinbefore is received from a first mobile entity 110 in a control process executed in the edge cloud computing layer L3. The request indicates one or more processing entities of the edge computing layer L3 as possible targets to transfer the active first-type slave process to, and optionally includes required compute resources for the active first-type slave process. In step 604 properties representative of the respective suitedness for executing the slave process indicated in the request are determined, at least for the processing entities indicated in the request. The properties are determined for a time window extending into the future that includes the current time. Next, in step 606, at least the processing entities received in the request are ranked in accordance with the determined current and/or future properties. Eventually, in step 608, the active slave process is transferred to the process entity having the highest rank, if the targeted process entity has been indicated in the request.

In optional embodiments, in case none of the process entities indicated in the request provides sufficient compute resources for accepting the request, the method 600 further comprises, in step 610, the control process returning, to the mobile entity 110, a response message comprising a maximum available compute resource for at least the processing entities indicated in the request. In step 612 of this embodiment a selection of a processing entity indicated in the response message is received from the mobile entity, and the active slave process is transferred accordingly in step 608. Alternatively, in step 612', a cancellation of the request is received.

The apparatuses and methods presented hereinbefore allow for an elastic transfer of slave processes or functions of master processes or functions executed in mobile entities, with the transfer being independent from wireless handover events. Advantageous embodiments of the methods allow for pre-emptive transfers of slave functions based on predictions for availability of resources, future locations of mobile entities, etc. Aspects of the methods allow for adjusting load sharing ratios based on such predictions, taking various priorities into account, e.g., priorities of functions of mobile entities, external priorities such as of authorities, commercial priorities based on service level agreements, and the like.

The invention claimed is:

1. A method of initiating a transfer of an active first-type slave process executed in a first processing entity of an edge cloud computing layer to a second processing entity of the edge cloud computing layer, wherein the active first-type slave process receives data and/or control information from an associated active first-type master process executed in a first mobile entity and returns processing results obtained based on the received data and/or the control information to the active first-type master process, wherein a plurality of processing entities is communicatively connected through a network layer, wherein a process sharing connection between the first-type master process executed in the first mobile entity and one of the one or more of the plurality of processing entities of the edge cloud computing layer includes a wireless link between the first mobile entity and one or more of a plurality of wireless access points of the network layer, the method comprising, at the first mobile entity:

receiving a first heat map relating to the first-type master-slave process, the first heat map providing information relevant to process sharing connections, between mobile entities and processing entities, for first-type master-slave processes, at least for a first area including a current and/or a future location of the first mobile entity, ranking, based on a cost function, possible process sharing connections, between the first mobile entity and one or more second processing entities-, for the current location of the first mobile entity and/or a location of the first mobile entity in the near future, wherein inputs to the cost function include the current requirements of the active master-slave process and information provided in the heat map, determining, based on the ranking, one or more second processing entities as potential target processing entities to transfer the first-type slave process to, and transmitting a processing entity transfer request to a control process executed in the edge cloud computing layer, wherein the request includes an identification of the active first-type slave process and indicates at least one of the one or more second processing entities determined, based on the ranking, as potential target to transfer the active first-type slave process to.

2. The method of claim 1, further including:

determining present conditions of process sharing connections, between mobile entities, including the first mobile entity, and processing entities of the edge cloud computing layer, for active first-type master-slave processes, within an area including a current location of the first mobile entity and/or within locations at which the first mobile entity will be in the near future, performing the ranking based on information provided in the received first heat map and the present conditions of the process sharing connections.

3. The method of claim 2, further comprising:

transmitting the determined present conditions of a process sharing connection for at least the active first-type master-slave process to a heat map process, for updating heat maps.

4. The method of claim 2, further comprising:

receiving a second heat map relating to master-slave processes of a second type, execution of which is shared between mobile entities and processing entities of the edge cloud computing layer, and that may compete for the same processing and/or communication resources, the second heat map providing information for a second area at least including the current location of the mobile entity, performing the ranking based on the first and the second heat map.

5. The method of claim 1, further comprising:

receiving a second heat map relating to master-slave processes of a second type, execution of which is shared between mobile entities and processing entities of the edge cloud computing layer, and that may compete for the same processing and/or communication resources, the second heat map providing information for a second area at least including the current location of the mobile entity, performing the ranking based on the first and the second heat map.

6. The method of claim 5, further comprising:

transmitting the determined present conditions of a process sharing connection for at least the active first-type master-slave process to a heat map process, for updating heat maps.

7. The method of claim 1, further comprising:

transmitting, in the processing entity transfer request, a compute resource desired or required for executing the first-type slave process.

8. The method of claim 1, further comprising:

receiving a maximum available compute resource available for the first-type slave process at least for the second processing entities indicated in the request, and adjusting the load sharing between the master and the slave process, or reconfiguring the master-slave process, and transmitting a message accepting the transfer, cancelling the processing entity transfer request, transmitting a time delay for the original transfer request that indicates a time period of validity for the request, or accepting a transfer to a second processing entity not specified in the request, in response to the received maximum available compute resource.

9. The method of claim 1, further comprising:

receiving, from one or more second mobile entities within the first area, information relating to conditions of their respective process sharing connections, and performing the ranking based on information provided in the received first heat map and the received information relating to conditions of second mobile entities' process sharing connections.

10. The method of claim 1, further comprising:

receiving, from one or more second mobile entities within the first area, information relating to their respective first-type master-slave processes, identifying, from the received information relating to the first-type master-slave processes of the one or more second mobile entities, input data common to the input data of the first-type master-slave process of the first mobile entity, and receiving processing results of the first-type slave process from a second mobile entity or from the processing entity assigned to the second mobile entity, or providing processing results of the first-type slave process to a second mobile entity.

11. A method of controlling a transfer of an active first-type slave process executed in a first processing entity of an edge cloud computing layer to a second processing entity of the edge cloud computing layer, the method comprising, at a control process executed in the edge cloud computing layer:

receiving, from a first mobile entity, a slave process transfer request generated in accordance with claim 1, wherein the request indicates one or more processing entities of the edge computing layer as possible targets to transfer the active first-type slave process to, and optionally includes required compute resources for the active first-type slave process, determining properties, representative of the respective suitedness for executing the slave process indicated in the request, at least for the processing entities indicated in the request, within a time window extending into the future that includes the current time, ranking at least the processing entities received in the request in accordance with the determined current and/or future properties, and transferring the active slave process to the processing entity having the highest rank, if the targeted processing entity has been indicated in the request.

12. The method of claim 11, further comprising, if none of the process entities indicated in the request provides sufficient compute resources for accepting the request:

the control process returning, to the mobile entity, a response message comprising a maximum available compute resource for at least the processing entities indicated in the request, and receiving, from the mobile entity, a selection of a processing entity indicated in the response message, and transferring the slave process in accordance with the selection, or receiving a cancellation of the request.

13. A mobile entity comprising a microprocessor, associated memory, and a wireless communication interface, which are communicatively coupled via one or more data buses, wherein the memory stores computer program instructions which, when executed by the microprocessor, configures the mobile entity to execute the method of claim 1.

14. An edge cloud computing layer comprising physical and/or logical processing entities that are communicatively connected with each other through a network layer, wherein the edge cloud computing layer executes one or more control processes that are configured to initiate, maintain and transfer a plurality of slave processes on or between processing entities, respectively, in response to requests received from mobile entities in accordance with claim 13.

* * * * *